United States Patent
de Cerqueira Gatti et al.

(10) Patent No.: US 9,971,849 B2
(45) Date of Patent: May 15, 2018

(54) METHOD AND SYSTEM FOR RETRIEVING LEGAL DATA FOR USER INTERFACE FORM GENERATION BY MERGING SYNTACTIC AND SEMANTIC CONTRAINTS

(75) Inventors: Maira Athanazio de Cerqueira Gatti, Botafogo (BR); Ricardo Guimaraes Herrmann, Consolacao (BR); David Matthew Loewenstern, New York, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/248,286

(22) Filed: Sep. 29, 2011

(65) Prior Publication Data

US 2013/0086462 A1    Apr. 4, 2013

(51) Int. Cl.
| | | |
|---|---|---|
| G06F 17/30 | (2006.01) | |
| G06F 17/22 | (2006.01) | |
| G06F 17/24 | (2006.01) | |
| G06F 17/27 | (2006.01) | |

(52) U.S. Cl.
CPC ...... *G06F 17/3092* (2013.01); *G06F 17/2247* (2013.01); *G06F 17/243* (2013.01); *G06F 17/272* (2013.01); *G06F 17/2725* (2013.01)

(58) Field of Classification Search
CPC .... G06F 17/30923; G06F 17/243; G06F 8/38; G06F 17/30507; G06F 2221/2133; G06F 17/2725; G06F 9/4443; G06F 17/272
USPC ................................................. 715/222, 234
See application file for complete search history.

(56) References Cited

U.S. PATENT DOCUMENTS

| | | | | |
|---|---|---|---|---|
| 5,367,619 | A * | 11/1994 | Dipaolo et al. | ............... 715/221 |
| 5,966,686 | A * | 10/1999 | Heidorn | ............... G06F 17/271 |
| | | | | 704/9 |
| 6,728,762 | B1 * | 4/2004 | Estrada | ............ G06F 17/30873 |
| | | | | 707/999.01 |
| 7,701,510 | B2 | 4/2010 | Lewis | |
| 8,078,960 | B2 * | 12/2011 | Chalecki et al. | ............ 715/234 |
| 2003/0078949 | A1 * | 4/2003 | Scholz et al. | ................ 707/505 |
| 2004/0046804 | A1 | 3/2004 | Chang | |

(Continued)

FOREIGN PATENT DOCUMENTS

WO    WO 0137170 A2 *  5/2001

OTHER PUBLICATIONS http://www.json.org/, Introducing JSON (5 pages) Created On;May 8, 2000; Last Updated on:May 9, 2013.

(Continued)

*Primary Examiner* — Laurie A Ries
*Assistant Examiner* — Brian Garmon
(74) *Attorney, Agent, or Firm* — Harrington & Smith; Louis Percello

(57) ABSTRACT

An aspect of this invention is a method that includes receiving input data from an application. The input data includes information descriptive of at least one field. The method further includes processing the input data to form an array composed of legal data for the at least one field. The array is formed by merging a result of processing syntactic constraints and a result of processing semantic constraints. The method further includes outputting the array to the application. A system for performing the method is also described, as is a computer program product that can be used to execute the method.

19 Claims, 5 Drawing Sheets

(56) References Cited

U.S. PATENT DOCUMENTS

| | | | | |
|---|---|---|---|---|
| 2004/0205563 | A1* | 10/2004 | Lee | G06F 17/30896 715/234 |
| 2004/0268229 | A1* | 12/2004 | Paoli et al. | 715/508 |
| 2005/0028084 | A1* | 2/2005 | Dziejma | 715/505 |
| 2006/0041423 | A1* | 2/2006 | Kline | G06F 11/3676 704/9 |
| 2006/0288270 | A1 | 12/2006 | Gaurav et al. | |
| 2007/0112851 | A1* | 5/2007 | Tomic | G06F 17/2247 |
| 2007/0130511 | A1* | 6/2007 | Roberge | G06N 5/02 715/204 |
| 2007/0294282 | A1* | 12/2007 | Cruver | G06F 17/30911 |
| 2008/0030383 | A1* | 2/2008 | Cameron | 341/55 |
| 2008/0104511 | A1 | 5/2008 | Chinnadurai et al. | |
| 2011/0246870 | A1* | 10/2011 | Dong | G06F 11/3604 715/237 |

OTHER PUBLICATIONS

D. Crockford, The application/json Media Type for JavaScript Object Notation (JSON), Network Working Group, Request for Comments: 4627, Category: Informational, Jul. 2006 (10 pages).

http://www.w3.org/XML/Schema.html , W3C Ubiquitous Web domain, XML Schema (29 pages) Created Apr. 2000 Revision: 1.153; Date: Jun. 22, 2012.

K. ZYP, A JSON Media Type for Describing the Structure and Meaning of JSON Documents, draft-zyp-json-schema-03: Internet Engineering Task Force, Internet-Draft. Intended Status: Informational, Nov. 22, 2010 (28 pages).

http://json-schema.org/ The Home of JSON Schema: Created on:Nov. 20, 2007; Last Updated on:Nov. 30, 2012 (1 page).

Walsh, David: http://davidwalsh.name/json-validation , JSON Validation with JSON Schema; Nov. 23, 2010 (5 pages).

http:/jsonlint.com/ , The JSON Validator—A Tool from the Arch90 Lab—Chris Dary; Updated Date: Jan. 27, 2012 Creation Date: Jan. 7, 2008 (2 pages).

http://www.schematron.com/ , A Language for Making Assertions about Patterns Found in XML Documents; Updated Date: Dec. 18, 2011; Creation Date: Mar. 13, 2001 (4 pages).

https:://www.p6r.com/, Cross-Platform Solutions, Updated Date: Jul. 15, 2011; Creation Date: Feb. 20, 2004 (1 page).

https://www.p6r.com/articles/2008/05/06/xslt-and-xpath-for-json/ , Joseph, Mark; XSLT and XPath for JSON; May 6, 2008 (8 pages).

https://www.p6r.com/software.html ; Updated Date: Jul. 15, 2011; Creation Date: Feb. 20, 2004 (1 page).

Standard ECMA-262 3rd Edition—Dec. 1999, ECMAScript 3.1 Language Specification—Draft, ECMA Standardizing Information and Communciation Systems (233 pages).

\* cited by examiner

Schematron rule exasmples

`<fieldName>*#<'required' or 'not required'>*#dependency:<field>#<XPath_expression>#<message>`

The user needs menu for pools

```
<sch:report test="(/ValidationData/InputData/DesiredFields/Workorder/pool='')" >
    pool#required##//Facts/pool#
</sch:report>
```

Output: The pool field is always required, has no dependency, and the pool list according to the Xpath expression.

Xpath for returning legal values

The user is creating a workorder and asks menu for the customer field

```
<sch:report test="(/ValidationData/InputData/Action='CREATE') and
    (/ValidationData/InputData/DesiredFields/Workorder/customer='')" >
customer#required#dependency:pool#
//Facts/pool[@value='<sch:value-of-select="/ValidationData/InputData/Workorder/pool" />']/customer#
</sch:report>
```

Output: Customer field is required, depends on the pool field, and the Xpath expression for getting the valid data for the customer field given the specified pool.

FIG. 3

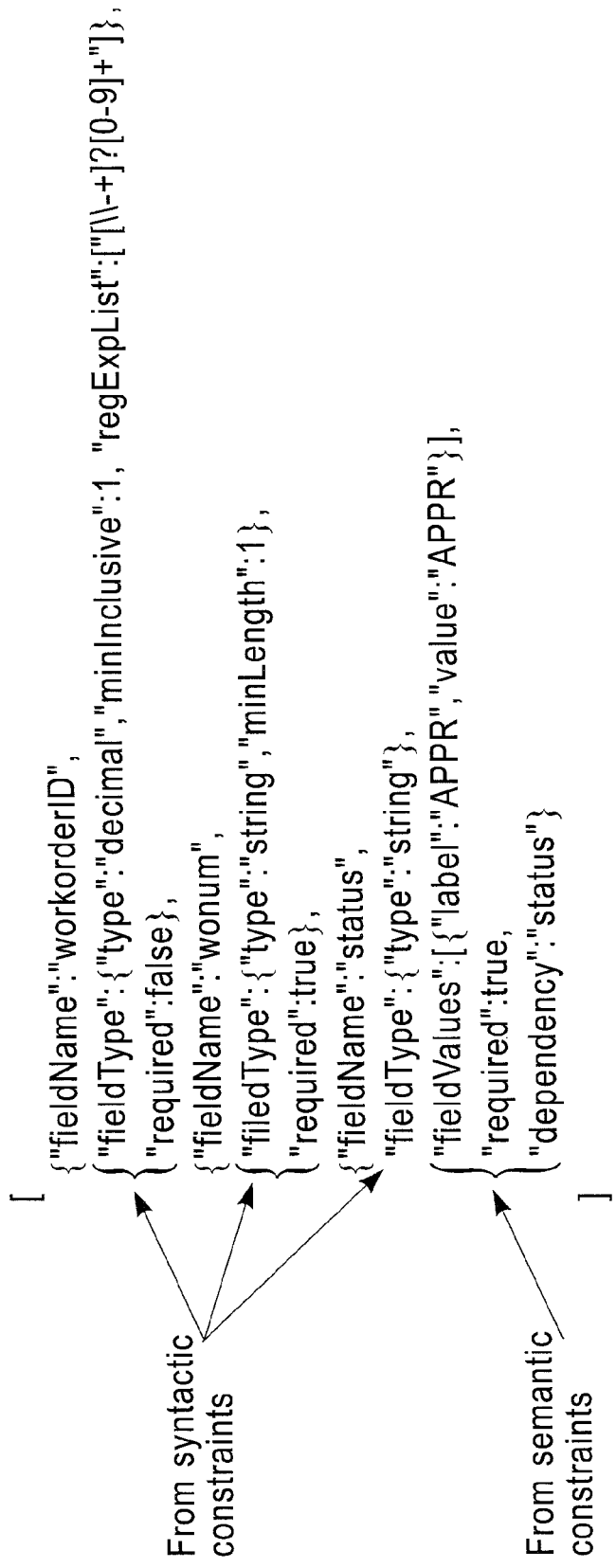

METHOD AND SYSTEM FOR RETRIEVING LEGAL DATA FOR USER INTERFACE FORM GENERATION BY MERGING SYNTACTIC AND SEMANTIC CONTRAINTS

TECHNICAL FIELD

The exemplary embodiments of this invention relate generally to methods, systems and computer program products configured for operating a system to process extensible markup language (XML) documents derived from input data, such as a form having one or more fields.

BACKGROUND

The Schematron (Schematron.com) differs from other schema languages in that it not based on grammars but instead on finding tree patterns in a parsed document. This approach is said to allow many kinds of structures to be represented which are inconvenient and difficult in grammar-based schema languages. The Schematron is said to allow the development and mixing two kinds of schemas: (a) report elements that allow diagnosing which variant of a language is being processed, and (b) assert elements that allow confirmation that a document conforms to a particular schema.

The Schematron is based on simple actions:
first, find context nodes in the document (typically an element) based on XPath path criteria; and
then, check to determine if some other XPath expressions are true, for each of the found context nodes.

An XML Path Language (XPath) expression uses a path notation, similar to those used in URLs, for addressing parts of an XML document. The expression is evaluated to yield an object of the node-set, Boolean, number, or string type. For example, the expression X/Y will return a node-set of the <Y> elements contained in the <X> elements, if such elements are declared in the source XML document.

Schematron is an example of a rule-based language that allows the specification of semantic constraints. Schematron is based on the tree pattern (XPath) and is capable of expressing constraints in ways that other XML schema languages, such as XSD Schema and DTD cannot, e.g., data values, (inter-)dependencies, co-constraints, data state transitions, etc. and business rules.

Extensible markup language (XML) schemas express shared vocabularies and enable machines to carry out human-defined rules. XML schemas provide a means for defining the structure, content and semantics of XML documents.

In a general sense an XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

Languages have been developed specifically to express XML schemas. The Document Type Definition (DTD) language, which is native to the XML specification, is one such type of language. Two more expressive XML schema languages are XML Schema and RELAX.

The mechanism for associating an XML document with a schema varies according to the schema language. The association may be achieved via markup within the XML document itself, or via some external means.

Currently available languages for expressing XML schemas are deficient in certain respects, such as in providing an ability to employ a combination of syntactic and semantic constraints.

SUMMARY

In one aspect thereof the exemplary embodiments of this invention provide a method that includes receiving input data from an application comprising information descriptive of at least one field; processing the input data to form an array comprised of legal data for the at least one field, the array being formed by merging a result of processing syntactic constraints and a result of processing semantic constraints; and outputting the array to the application.

In another aspect thereof the exemplary embodiments of this invention provide a computer-readable medium that contains computer program instructions, where execution of the computer program instructions by at least one data processor results in performance of operations that comprise receiving input data from an application comprising information descriptive of at least one field; processing the input data to form an array comprised of legal data for the at least one field, the array being formed by merging a result of processing syntactic constraints and a result of processing semantic constraints; and outputting the array to the application.

In yet another aspect thereof the exemplary embodiments of this invention provide a data processing system that comprises at least one data processor connected with at least one memory that stores computer program instructions and at least one interface connected with the at least one data processor and configured for conducting bidirectional communications via at least one network. The at least one data processor operates under control of the computer program instructions to receive input data from an application via the at least one interface, the input data comprising information descriptive of at least one field; to process the input data to form an array comprised of legal data for the at least one field, the array being formed by merging a result of processing syntactic constraints and a result of processing semantic constraints; and to output the array to the application via the at least one interface.

BRIEF DESCRIPTION OF THE SEVERAL VIEWS OF THE DRAWINGS

FIG. 3 illustrates Schematron rule examples.

FIG. 4 illustrates a more detailed example of an Array output showing those elements derived from syntactic constraints and those elements derived from semantic constraints.

DETAILED DESCRIPTION

The exemplary embodiments of this invention enable methods and apparatus to retrieve "legal" data for User Interface (UI) form generation by merging syntactic and semantic constraints. Legal data, which can also be referred to as "valid" data, can be considered to include, as non-limiting and non-exhaustive examples, data types and data structures; data values, (inter-)dependencies and co-constraints; and data state transitions. A desired output can include a list of legal values for each field of a form to be generated.

Note that the specifics of an input data assemblage that represents a document, object, or array can depend on the specifics of a parser implementation, as well on the programming language that is used. A data assemblage can be viewed as encompassing any type of input data that can be processed, such as an XML document, or an array structure having one or more elements.

It is pointed out that while the embodiments of this invention will be described in the context of XML documents, the embodiments of this invention are applicable to any tree-structure-based document such as, but not limited to, JSON, HTML and any SGML-based document.

Figure 1:
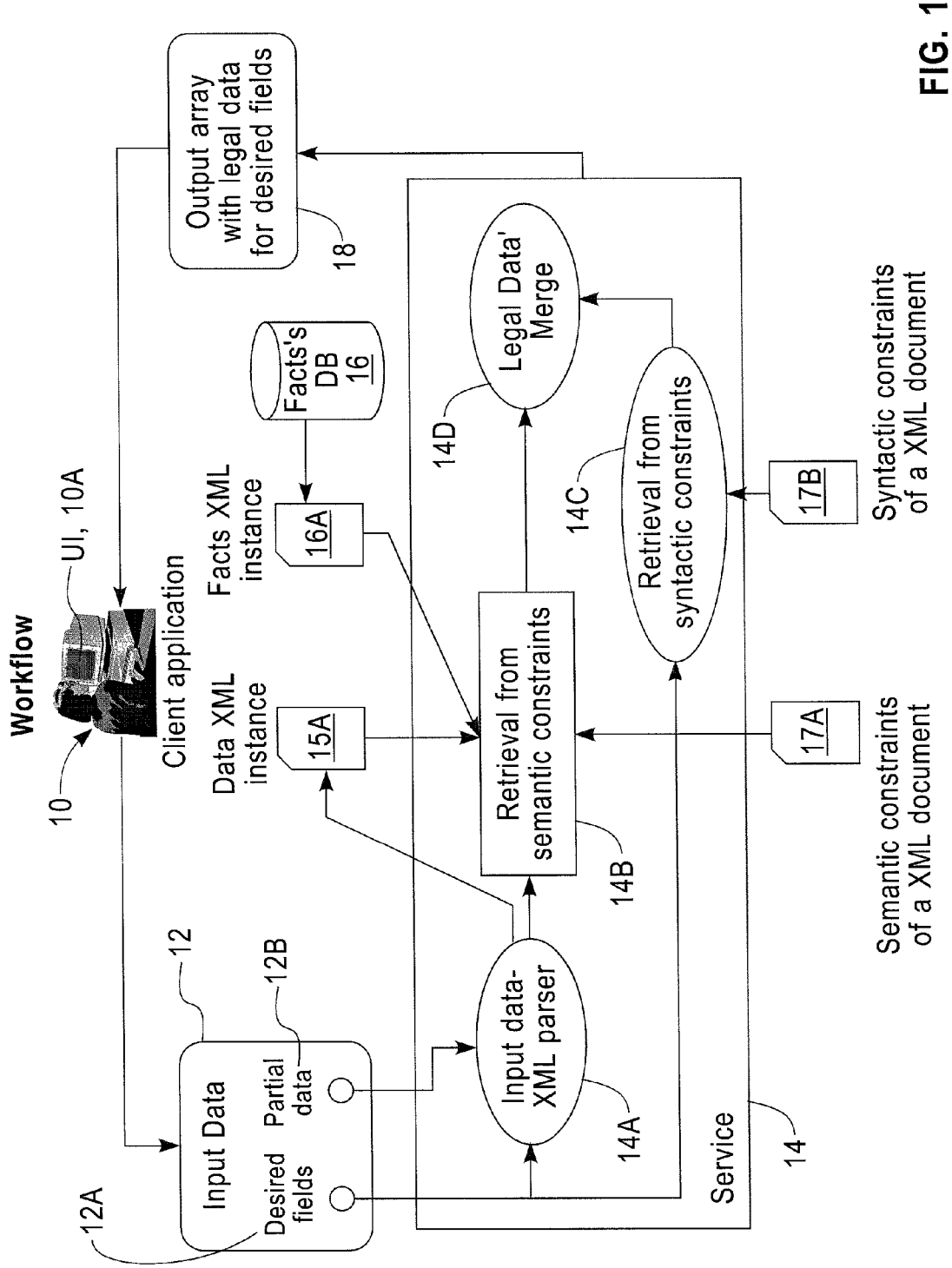
FIG. 1 illustrates an overall workflow in accordance with the exemplary embodiments of this invention.

FIG. 1 describes an overall workflow in accordance with the exemplary embodiments of this invention. Major elements shown in FIG. 1 include a client application 10 that can have an associated User Interface (UI) 10A. The client application 10 generates input data 12 (a data assemblage) that is comprised of desired fields 12A and partial data 12B. A processor, referred to herein also as a service 14, accepts the input data 12 and operates on the input data in conjunction with the output of a facts database (DB) 16 (providing a facts XML instance 16A), a data XML instance 15A provided from an input data XML parser function 14A, semantic constraints of an XML document 17A and syntactic constraints of an XML document 17B. In addition to the input data XML parser function 14A the service 14 includes a function to perform retrieval from semantic constraints 14B, a function to perform retrieval from syntactic constraints 14C and a legal data merge function 14D that provides as an output of the service 14 to the client application 10 an output array 18 with legal data for desired fields. In accordance with an aspect of this invention the output array 18 is formed by merging outputs of the retrieval from syntactic constraints 14B and syntactic constraints 14C.

The workflow is initiated with the client application 10 requesting valid data to display on the UI 10A or to forward to any other application that requires the data. For example, assume that the client application 10 requests a form in order to register in a particular website. This form may contain text fields which are constrained by type (string) and length (e.g., 100 bytes). The form can also contain combination (combo) fields that list valid values for that particular field. For example, one or more Date fields may be constrained to hold only dates in the past or only dates in the future. Furthermore, combo fields may be constrained by other fields. As one non-limiting example a user may need to select a city after selecting a state. The same can occur in Date fields such as when a second Date field must be set to specify a date that is further in the future than a date specified in a first Date field. These types of constraints can be referred to as co-constraints and/or as inter-dependencies. For a co-constrained field the user is required to specify the value of the field that then constrains the other field.

The input to the service 14 therefore contains: (i) the desired fields 12A that the client application 10 needs to display in the form and which will also be used to validate the user's input, and (ii) any partial data 12B regarding values that constrain one or more of the desired fields.

The input data XML parser function 14A of the service 14 parses the input data 12 into an XML document or documents (data XML instance 15A) in order to process the retrieval of the valid data from the specified semantic constraints 17A and to subsequently merge the results with the retrieval from the syntactic constraints logic 17B. The operation of the legal data merge function 14D involves adding to or combining with all of the legal values retrieved by the semantic constraints logic 14B and the syntactic valid data output from the retrieval from syntactic constraints function 14C. For example, the syntactic constraints define the type of the desired field, while the semantic constraints define the legal values for that field. These are merged into a field object structure (the output array 18) in such a manner that the client application 10 can locate both the legal values and the field type information in the same field object.

The retrieval from semantic constraints function 14B assumes that there is at least one XML document (Facts XML instance document 16A) that contains facts of which a rule engine that forms a part of the retrieval from semantic constraints function 14B can use to infer if there are inter-dependencies. By taking the previous non-limiting example of the city versus state dependencies, the Facts XML instance document 16A retrieved from the Facts DB 16 could contain the following data:

```
<State value="New York">
    <Cities>
        <City>Albany</City>
        <City>Binghamton</City>
        <City>New York City</City>
    </Cities>
</State>
```

Figure 2:
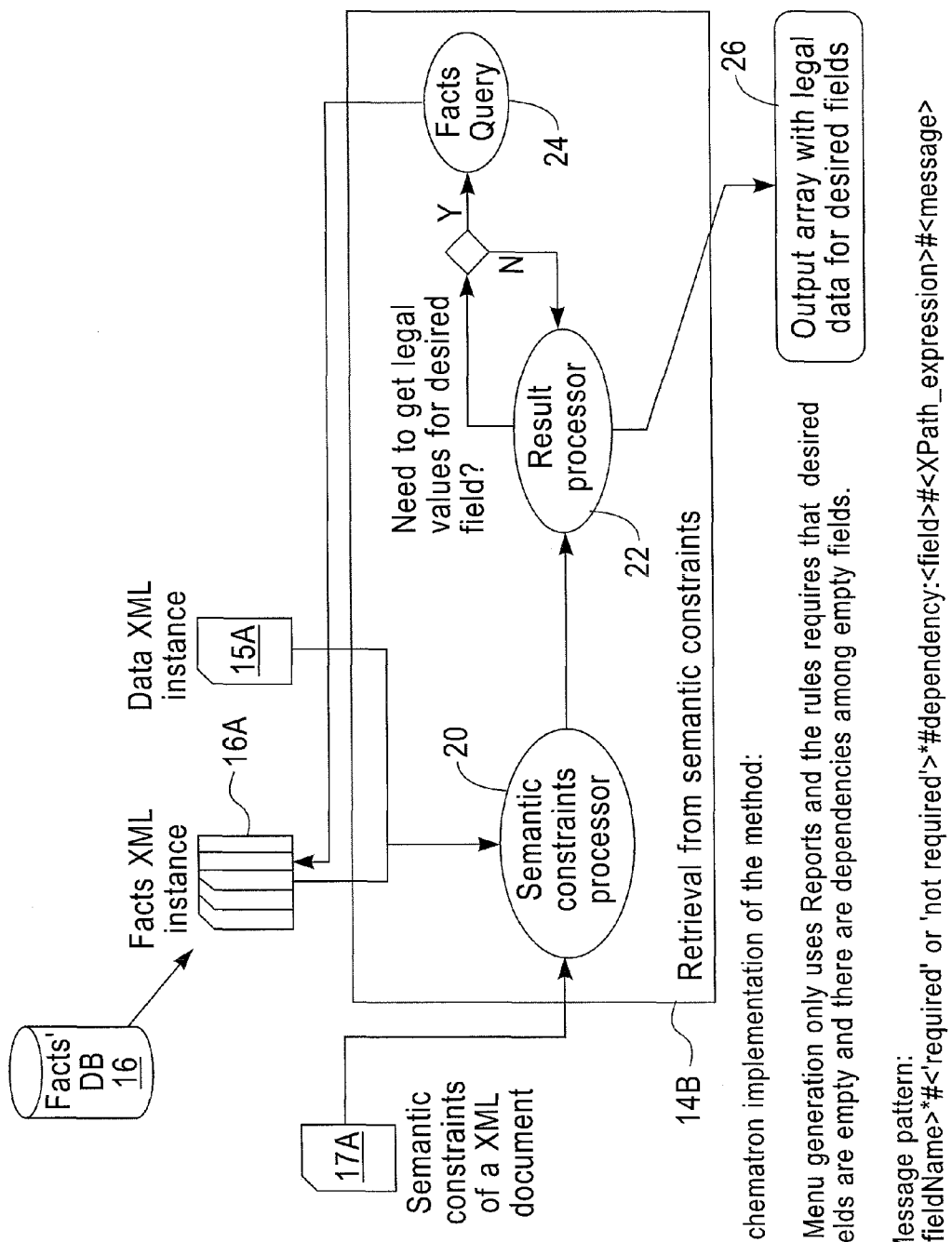
FIG. 2 shows in further detail how valid data is retrieved from semantic constraints.

FIG. 2 shows in further detail how the valid data is retrieved from the semantic constraints. There is at least one document 17A that contains the specification of the semantic constraints of a given XML document. This data is provided to a semantic constraints processor 20. Assume as a non-limiting example that the semantic constraints processor 20 is implemented using Schematron. The document 17A is then the Schematron schema, and by adding semantics in the message retrieved from the Report element, one may specify XPath expressions that will be the output of the processor 20 and that will be used in a Result processor 22. The Result processor 22 queries via facts query function 24 the Facts XML instance document 16A. After processing the results for all fields that depend on other fields and contain XPath expressions to be executed, the output of the Result processor 22 is an output array 26 with the legal data for the desired fields specified in the Data XML instance 15A. The array 26 is input to the legal data merge function 14D shown in FIG. 1.

As an example of the implementation using Schematron, considering the following table. Reference can also be made to FIG. 3 which illustrates Schematron rule examples. The output shown in FIG. 3 indicates that the Customer field is required and depends on the pool field and the XPath expression for returning legal values for the Customer field given the specified pool.

Desired Field: subAccount for a Given Customer

```
<sch:rule context="MenuForSubAccount">
    <sch:report test="(/ValidationData/InputData/DesiredFields/
        Workorder/subAccount=')">
```

```
subAccount#not required#dependency:customer#//Facts/pool[@value='
<sch:value-of select = "/ValidationData/InputData/Workorder/pool"
/>']/customer[@value='<sch:value-of select="/ValidationData/
InputData/Workorder/customer" />']/subAccount#
        </sch:report>
</sch:rule>
```

In this example the client application 10 has requested valid data to display in the combination of the subAccount field. Because this list of values depends on other fields (in the example, pool and customer), values for these fields are needed as input.

However, Schematron cannot process XPath expressions in the Report messages, only during the test, in this case: <sch:report test="(/ValidationData/InputData/DesiredFields/Workorder/subAccount=")">, where a check is made to determine if the subAccount field was specified as being required.

Schematron will output the following message:

```
subAccount#not required#dependency:customer#//Facts/pool[@value='
<sch:value-of select = "/ValidationData/InputData/Workorder/pool"
/>']/customer[@value='<sch:value-of select="/ValidationData/
InputData/Workorder/customer" />']/subAccount#
```

This must conform to the following:
<fieldName>*#<'required' or 'not required'>*#dependency:
<field>#<XPath_expression>#<message>

What is meant in the foregoing non-limiting example is that the subAccount field is not required, and depends on the customer field (which depends on the pool field), and the XPath expression for obtaining the valid data for the subAccount field given the specified customer and pool.

The fields with * mean that they are always required to be specified, while the other fields (dependency, XPath expression and message) depend on the type of constraint.

For example, the Facts XML instance document 16A contains values in the following tree-structure:

```
<Pool/>
    <Customer/>
        <SubAccount/>
```

Referring also to FIG. 1, the output array 24 with the valid data retrieved from the semantic constraints processor 20 and result processor 22 logic will be merged with the output of the syntactic constraints logic 14C in the legal data merge function 14 to provide the output array 18 with the legal data for the desired fields.

Assume that the syntactic constraints logic was specified with XML Schema, referred to as XSD. As but one example, US Patent Publication 2006/0288270 A1, "Automated Presentation Layer Generation", describes a method for performing parsing, loading and using valid data retrieved from an XSD schema. The parser of the XSD schema extracts the valid data for the desired fields into an Array 26 to be merged by Legal Data Merge function 14D (FIG. 1) with the semantic constraints logic 14B output. The merged output array 18 is then returned to the client application 20. The merged output array 18 may be acceptable as is, otherwise the client application 10 can iterate over the workflow in order to request more valid data for co-constrained fields not previously specified (e.g., because the values were not available).

FIG. 4 illustrates an example of the output (merged) array 18 showing those elements derived from syntactic constraints and those elements derived from semantic constraints.

In accordance with the exemplary embodiments of this invention, by merging the results of syntactic constraints with semantic constraints the UI form generation becomes more powerful. This is true at least for the reason that the operation of the service 14 of FIG. 1 complements the valid (legal) values for each field with the results of constraints on data values, (inter-)dependencies, co-constraints and data state transitions, among others, which are typically needed to express business rules.

Figure 5:
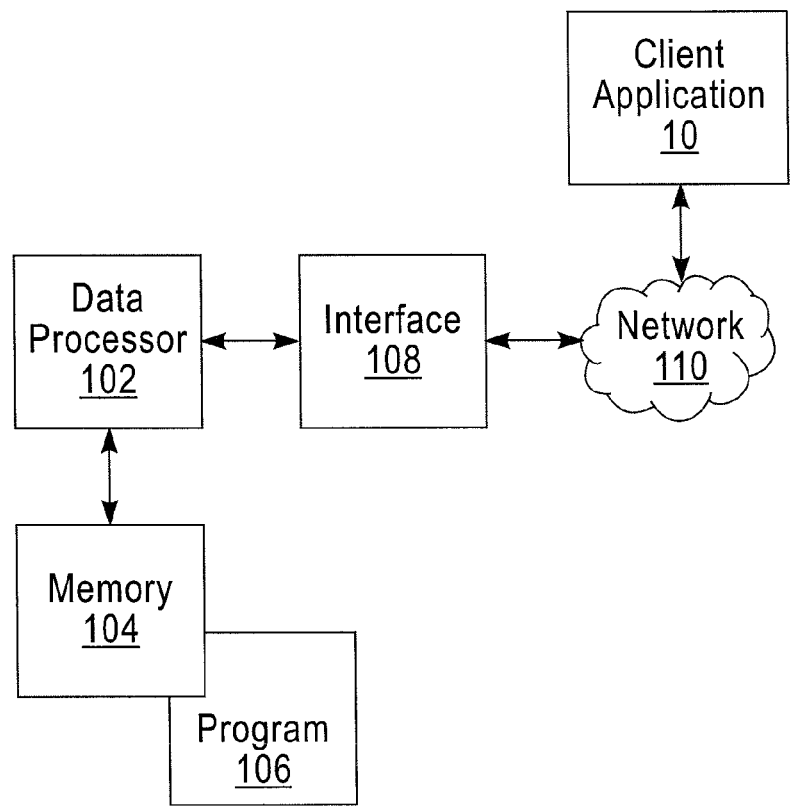
FIG. 5 shows an example of a computer system that can be used to implement the workflow of FIG. 1.

FIG. 5 shows an example of a computer system or data processing system 100 that can be used to implement the service 14 of FIG. 1. As will be discussed in even further detail below, at least one computer or data processor 102 is connected with at least one computer readable medium such as a memory device or a memory system 104 that stores computer program instructions 106. Execution of the computer program instructions 106 results in the performance of methods in accordance with this invention. The system 100 can be implemented as, for example, a personal computer-type device, as a workstation-type device or as a main frame type device. The at least one data processor 102 can be implemented in any suitable form including as one or microprocessors or microcontrollers. The memory device or system 104 can be implemented as one or more of, for example, solid state memory including dynamic RAM and/or static RAM, Flash memory, magnetic memory including disk and/or tape, or as optical memory. The computer program instructions 106 can be written in any suitable programming language and can be compiled prior to execution or executed by an interpreter. The system 100 includes at least one interface 108 that enables bidirectional communication with one or more external systems, memories and/or user terminals, such as the client application 10 shown in FIG. 1. The at least one interface 108 can be configured to interface to a network 110, such as one or both of a local area network (LAN) and a wide area network (WAN) such as the Internet, via wired or wireless communication paths.

Note that in some embodiments the workflow depicted in FIG. 1 may be contained in whole or in part in the system that hosts the client application 10 and, as such, the interface 108 may be an internal interface such as a local data bus for example.

Figure 6:
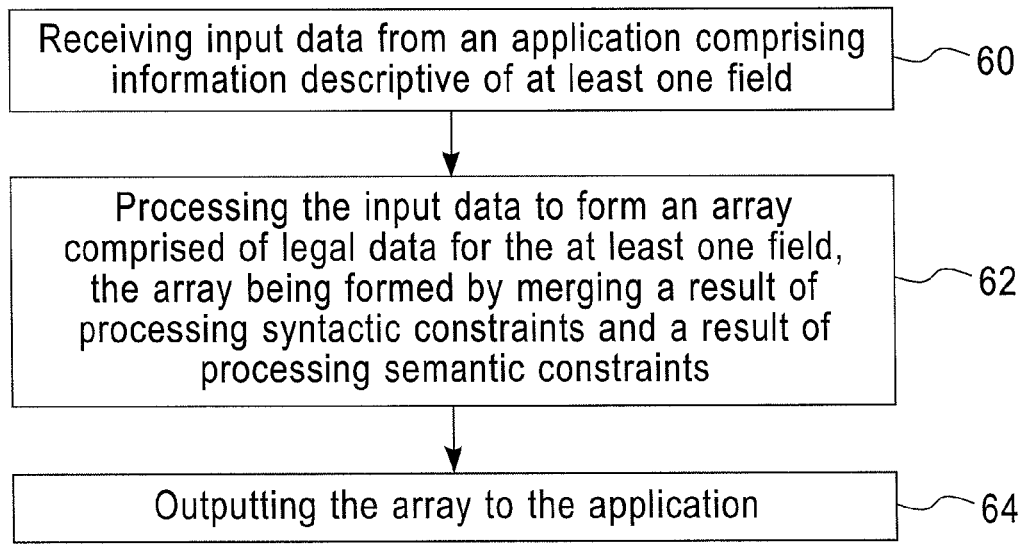
FIG. 6 is a logic flow diagram that is descriptive of a method of this invention, as well as the execution of computer program instructions shown in FIG. 5.

FIG. 6 is a logic flow diagram that is descriptive of a method of this invention, as well as the execution of the computer program instructions 106 shown in FIG. 5. At Block 60 there is a step of receiving input data from an application comprising information descriptive of at least one field. At Block 62 there is a step of processing the input data to form an array comprised of legal data for the at least one field, the array being formed by merging a result of processing syntactic constraints and a result of processing semantic constraints. At Block 64 there is a step of outputting the array to the application.

As should be appreciated by one skilled in the art, aspects of the present invention may be embodied as a system, method, computer program product or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method comprising:
receiving first data at a service from a client application, the received first data comprising information descriptive of at least one field of a data assemblage used by the client application and partial data having at least one value that constrains the at least one field, where the data assemblage represents a form containing the at least one field that is to be displayed by the client application to a user with a user interface of the client application, the at least one field being one in which the user of the client application will enter user data into the displayed form to be validated by the client application;
processing the received first data at the service to form an array comprised of legal data for the at least one field, the array being formed by merging a result of processing syntactic constraints to define field type information for the at least one field and a result of processing semantic constraints to define legal values for the at least one field based at least on the partial data;
outputting the array formed by the merging of the result of processing syntactic constraints and the result of processing semantic constraints from the service to the client application such that the client application configured to generate the form based on both the field type information and the legal values in the array for the at least one field such that the client application is enabled to validate user data that is subsequently entered by the user of the client application into the at least one field; and
where in response to the client application iterating over a workflow associated with the outputted array formed by the merging of the result of processing syntactic constraints and the result of processing semantic constraints, receiving at the service from the client application a request for more legal data for at least one co-constrained field of the form that is displayed to the user that was not previously specified by the client application in the received first data.

2. The method of claim 1, further comprising parsing the received first data using an XML, parser to derive a data XML instance.

3. The method of claim 2, where the data XML instance is used, when processing semantic constraints, in conjunction with a facts XML instance obtained from a facts database in order to infer if an inter-dependency is present.

4. The method of claim 1, where the array that is output to the client application is formed so as to complement the legal values for the at least one field with results of constraints on at least one of data values, (inter-)dependencies, co-constraints and data state transitions.

5. A computer program product embodied on a non-transitory computer-readable medium, where execution of the computer program product results in performance of the method as claimed in claim 1.

6. The method of claim 1, wherein the partial data comprises an indication that the at least one field is dependent on at least one other field contained in the form.

7. The method of claim 1, wherein the at least one field comprises at least one of:
a text field;
a number field; and
a Boolean field.

8. A non-transitory computer-readable medium that contains computer program instructions, the execution of the computer program instructions by at least one data processor results in performance of operations that comprise:
receiving first data at a service from a client application, the received first data comprising information descriptive of at least one field of a data assemblage used by the client application and partial data having at least one value that constrains the at least one field, where the data assemblage is comprised of a form containing the at least one field that is to be displayed by the client application to a user with a user interface of the client application, the at least one field being one in which the user of the client application will enter user data into the displayed form to be validated by the client application;
processing the received first data at the service to form an array comprised of legal data for the at least one field, the array being formed by merging a result of processing syntactic constraints to define field type information for the at least one field and a result of processing semantic constraints to define legal values for the at least one field based at least on the partial data; and
outputting the array formed by the merging of the result of processing syntactic constraints and the result of processing semantic constraints from the service to the client application such that the client application is configured to generate the form based on both the field type information and the legal values in the array for the at least one field such that the client application is enabled to validate user data that is subsequently entered by the user into the at least one field;
where in response to the client application iterating over a workflow associated with the outputted array formed by the merging of the result of processing syntactic constraints and the result of processing semantic constraints, receiving at the service from the client application a request for more legal data for at least one co-constrained field of the form that is displayed to the user that was not previously specified by the client application in the received first data.

9. The computer-readable medium of claim 8, further comprising an operation of parsing the received first data using an XML parser to derive a data XML instance.

10. The computer-readable medium of claim 9, where the data XML instance is used, when processing semantic constraints, in conjunction with a facts XML instance obtained from a facts database in order to infer if an inter-dependency is present.

11. The computer-readable medium of claim 8, where the array that is output to the client application is formed so as to complement the legal values for the at least one field with results of constraints on at least one of data values, (inter-) dependencies, co-constraints and data state transitions.

12. The computer-readable medium of claim 8, wherein the partial data comprises an indication that the at least one field is dependent on at least one other field contained in the form.

13. The computer-readable medium of claim 8, wherein the at least one field comprises at least one of:
   a text field;
   a number field; and
   a Boolean field.

14. A data processing system, comprising:
   at least one data processor connected with at least one memory that stores computer program instructions, the at least one data processor comprising a part of a service;
   at least one interface connected with the at least one data processor and configured for conducting bidirectional communications with a client application via at least one network;
   said at least one data processor operating under control of the computer program instructions to receive first data at the service from the client application via the at least one interface, the received first data comprising information descriptive of at least one field of a data assemblage used by the client application and partial data having at least one value that constrains the at least one field, where the data assemblage is comprised of a form containing the at least one field that is to be displayed by the client application to a user with a user interface of the client application, the at least one field being one in which the user of the client application will enter user data into the displayed form to be validated by the client application;
   said at least one data processor operating under control of the computer program instructions to process the received first data to form an array comprised of legal data for the at least one field, the array being formed by merging a result of processing syntactic constraints to define field type information for the at least one field and a result of processing semantic constraints to define legal values for the at least one field based at least on the partial data;
   said at least one data processor further operating under control of the computer program instructions to output the array formed by the merging of the result of processing syntactic constraints and the result of processing semantic constraints from the service to the client application via the at least one interface such that the client application is configured to generate the form based both the field type information and the legal values in the array for the at least one field such that the client application is enabled to validate user data that is subsequently entered by the user into the at least one field; and
   where in response to the client application iterating over a workflow associated with the outputted array formed by the merging of the result of processing syntactic constraints and the result of processing semantic constraints, said at least one data processor further operating under control of the computer program instructions to receive at the service from the client application a request for more legal data for at least one co-constrained field of the form that is displayed to the user that was not previously specified by the client application in the received first data.

15. The data processing system of claim 14, said at least one data processor further operating under control of the computer program instructions to parse the received data using an XML, parser to derive a data XML instance.

16. The data processing system of claim 15, where the data)ML instance is used, when processing semantic constraints, in conjunction with a facts)ML instance obtained from a facts database in order to infer if an inter-dependency is present.

17. The data processing system of claim 14, where the array that is output to the client application is formed so as to complement the legal values for the at least one field with results of constraints on at least one of data values, (inter-) dependencies, co-constraints and data state transitions.

18. The data processing system of claim 14, wherein the partial data comprises an indication that the at least one field is dependent on at least one other field contained in the form.

19. The data processing system of claim 14, wherein the at least one field comprises at least one of:
   a text field;
   a number field; and
   a Boolean field.

* * * * *